US010731034B2

(12) United States Patent
Hsueh et al.

(10) Patent No.: US 10,731,034 B2
(45) Date of Patent: Aug. 4, 2020

(54) POLYURETHANE UREA COMPOSITION AND PREPARATION METHOD THEREOF

(71) Applicant: Industrial Technology Research Institute, Hsinchu (TW)

(72) Inventors: Mao-Lin Hsueh, Pingtung County (TW); Yi-Zhen Chen, Tainan (TW); Hsiao-Chun Yeh, Taichung (TW); Yung-Chan Lin, Hsinchu (TW); Cheng-Han Hsieh, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 98 days.

(21) Appl. No.: 15/936,473

(22) Filed: Mar. 27, 2018

(65) Prior Publication Data

US 2019/0185668 A1 Jun. 20, 2019

(30) Foreign Application Priority Data

Dec. 20, 2017 (TW) .............................. 106144923 A

(51) Int. Cl.
*C08L 75/02* (2006.01)
*C08L 75/12* (2006.01)
*C08K 5/1565* (2006.01)
*C08K 5/1515* (2006.01)
*C08G 71/02* (2006.01)

(52) U.S. Cl.
CPC .............. *C08L 75/12* (2013.01); *C08G 71/02* (2013.01); *C08K 5/1515* (2013.01); *C08K 5/1565* (2013.01); *C08L 75/02* (2013.01)

(58) Field of Classification Search
CPC ....... C08L 75/02; C08L 75/04; C09D 175/00; C08G 71/04
See application file for complete search history.

(56) References Cited

U.S. PATENT DOCUMENTS

| 3,763,106 | A | * | 10/1973 | Markiewitz | ........... | C07C 275/10 |
|---|---|---|---|---|---|---|
| | | | | | | 528/263 |
| 4,959,499 | A | | 9/1990 | Harris | | |
| 5,175,231 | A | | 12/1992 | Rappoport et al. | | |
| 5,206,362 | A | | 4/1993 | Speranza et al. | | |
| 5,340,889 | A | | 8/1994 | Crawford et al. | | |
| 7,232,877 | B2 | | 6/2007 | Figovsky et al. | | |
| 2012/0145721 | A1 | * | 6/2012 | Cavallin | ................ | C08L 75/04 |
| | | | | | | 220/626 |
| 2014/0338550 | A1 | | 11/2014 | Sato | | |

FOREIGN PATENT DOCUMENTS

| EP | 0352141 | 1/1990 |
|---|---|---|
| TW | 201516099 | 5/2015 |

OTHER PUBLICATIONS

Kathalewar et al (Isocyanate free polyurethanes from new CNSL based bis-cyclic carbonate and its application in coatings, European Polymer Journal 57 (2014) 99-108, published online May 21, 2014.*

"Office Action of Taiwan Counterpart Application", dated Oct. 18, 2018, p. 1-p. 3.

(Continued)

*Primary Examiner* — Gregory Listvoyb
(74) *Attorney, Agent, or Firm* — JCIPRNET

(57) ABSTRACT

A polyurethane urea composition and a preparation method thereof are provided. The method includes mixing and reacting an urea and an amine compound to obtain a polyurea oligomer, and mixing and reacting the polyurea oligomer and a cyclic carbonate compound to obtain a polyurethane urea composition having a repeating unit represented by formula I:

—R²—U²—U¹—U²—R²—, wherein [formula I]

U¹ is

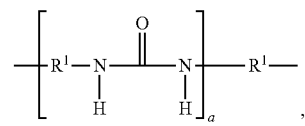

a is an integer of 1 to 10000,
each U² is independently

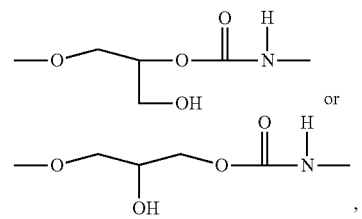

each R¹ is independently a C1 to C20 alkylene group, a C3 to C20 cycloalkylene group, a C8 to C20 alkylarylene group, a polyether group having a weight-average molecular weight of 100 g/mol to 10000 g/mol, or a combination thereof, and each R² is independently an aliphatic group, a cycloaliphatic group, an aromatic group substituted by an alkyl or an unsubstituted aromatic group, an oligo polyether group, an oligo polyester group, or a combination thereof.

3 Claims, 2 Drawing Sheets

(56) References Cited

OTHER PUBLICATIONS

Verma, S et al., "A nitrogen rich polymer as an organo-catalyst for cycloaddition of $CO_2$ to epoxides and its application for the synthesis of polyurethane," Sustainable Energy and Fuels, vol. 1, Aug. 2017, pp. 1-10.

Blain, M., et al., "Hydrogen bonds prevent obtaining high molar mass PHUs," J. Appl. Polym. Sci., vol. 134, Feb. 2017, pp. 1-13.

Jiexi Ke, et al., "Non-isocyanate polyurethane/epoxy hybrid materials with different and controlled architectures prepared from a $CO_2$-sourced monomer and epoxy via an environmentallyfriendly route," RSC Advances, May 2017, pp. 28841-28852.

Amelie Martin, et al., "Synthesis and properties of allyl terminated renewable non-isocyanate polyurethanes (NIPUs) and polyureas (NIPUreas) and study of their photo-crosslinking," European Polymer Journal, vol. 84, Nov. 2016, pp. 828-836.

\* cited by examiner

POLYURETHANE UREA COMPOSITION AND PREPARATION METHOD THEREOF

CROSS-REFERENCE TO RELATED APPLICATION

This application claims the priority benefit of Taiwan application serial no. 106144923, filed on Dec. 20, 2017. The entirety of the above-mentioned patent application is hereby incorporated by reference herein and made a part of this specification.

TECHNICAL FIELD

The disclosure relates to a polyurethane urea composition and a preparation method thereof.

BACKGROUND

The polyurethane (PU) material is currently extensively applied in many fields of each national economy, but the mechanical properties of the PU material itself are still insufficient for application in construction fields such as moisture resistance and corrosion resistance. Accordingly, since a polyurethane urea (PUU) material has more hydrogen bonds in comparison to a PU material, the PUU material is generally used to replace the PU material for application in the construction field.

However, the manufacture of the PUU material generally requires using isocyanate as a raw material, and isocyanate is highly toxic and has high volatility and therefore readily harms the human body in the process of making the PUU. Therefore, the development of a process for making PU without isocyanate is needed.

SUMMARY

The preparation method of the polyurethane urea composition of the disclosure includes the following steps. An urea and an amine compound are mixed and reacted to obtain a polyurea oligomer, wherein the molar ratio of the urea and the amine compound is 1:1 to 1:10000; and the polyurea oligomer and a cyclic carbonate compound are mixed and reacted to obtain a polyurethane urea composition having a repeating unit represented by formula I, wherein the molar ratio of the polyurea oligomer and the cyclic carbonate compound is 1:10 to 10:1;

—$R^2$—$U^2$—$U^1$—$U^2$—$R^2$—, wherein [formula I]

$U^1$ is

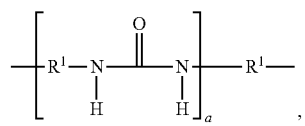

wherein a is an integer of 1 to 10000,
each $U^2$ is independently

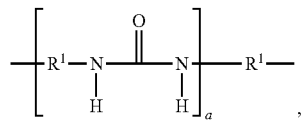

or

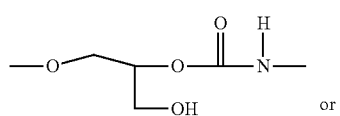

each $R^1$ is independently a C1 to C20 alkylene group, a C3 to C20 cycloalkylene group, a C8 to C20 alkylarylene group, a polyether group having a weight-average molecular weight of 100 g/mol to 10000 g/mol, or a combination thereof, and each $R^2$ is independently an aliphatic group, a cycloaliphatic group, an aromatic group substituted by an alkyl group or an unsubstituted aromatic group, an oligo polyether group, an oligo polyester group, or a combination thereof.

The polyurethane urea composition of the disclosure includes a repeating unit represented by formula I:

—$R^2$—$U^2$—$U^1$—$U^2$—$R^2$—, wherein [formula I]

$U^1$ is

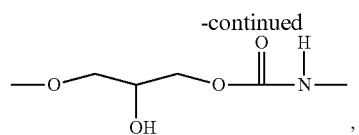

wherein a is an integer of 1 to 10000,
each $U^2$ is independently

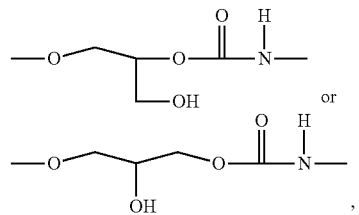

each $R^1$ is independently a C 1 to C20 alkylene group, a C3 to C20 cycloalkylene group, a C8 to C20 alkylarylene group, a polyether group having a weight-average molecular weight of 100 g/mol to 10000 g/mol, or a combination thereof, and each $R^2$ is independently an aliphatic group, a cycloaliphatic group, an aromatic group substituted by an alkyl group or an unsubstituted aromatic group, an oligo polyether group, an oligo polyester group, or a combination thereof.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
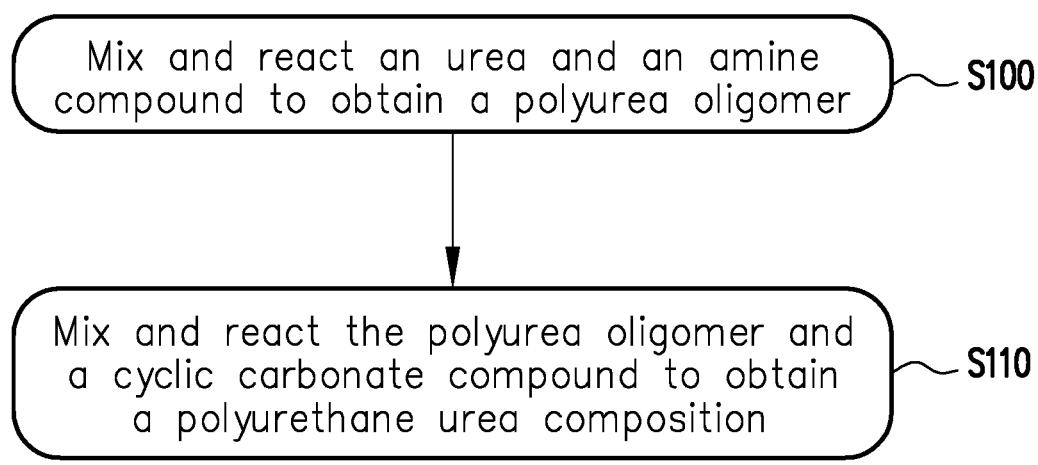
FIG. 1 is a preparation method of a polyurethane urea composition of an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a preparation method of a polyurethane urea composition of an embodiment of the disclosure.

Referring to FIG. 1, the preparation method of the polyurethane urea composition of the disclosure includes steps S100 and S110. In step S100, an urea and an amine compound are mixed and reacted to obtain a polyurea oligomer. In the mixing step, the amine compound in the reaction is, for instance, an amine compound having an amine-terminated group. In an embodiment, the amine compound in the reaction includes polyetheramine, alkylamine, cycloalkylamine, alkylarylamine, or a combination thereof. Specific examples of the amine compound may include, but not limited to, ethylene diamine, diethylene triamine, triethylene tetramine, tetraethylenepentamine, pentaethylenehexamine, 1,2-propylene diamine, 1,3-propylene diamine, 1,4-butanediamine, 1,5-pentanediamine, 1,3-pentanediamine, 1,6-hexanediamine, 3,3,5-trimethyl-1,6-hexanediamine, 3,5,5-trimethyl-1,6-hexanediamine, 2-methyl-1,5-pentanediamine, bis-(3-aminopropyl)amine, N,N'-bis-(3-amino-propyl)-1,2-ethanediamine, 1,2-diaminocyclohexane, 1,3-diaminocyclohexane, 1,4-diaminocyclohexane, meta-xylylene diamine, para-xylylene diamine, isophorone diamine, 3,3'-dimethyl-4,4'-diaminodicyclohexyl methane, 4,4'-diaminodicyclohexyl methane, and poly(alkylene oxide)diamine. The poly(alkylene oxide) diamine is, for instance, Jeffamine® D-230, Jeffamine D-400, Jeffamine D-2000, Jeffamine D-4000, Jeffamine EDR-148, Jeffamine EDR-192, Jeffamine ED-600, Jeffamine ED-900, or Jeffamine ED-2001 made by Huntsman Performance Products, or a combination thereof.

Moreover, the molar ratio of the urea and the amine compound is, for instance, 1:1 to 1:10000, preferably 1:2 to 1:100. In an embodiment, in the process of reacting the urea and the amine compound, the reaction temperature is 100° C. to 160° C. In an embodiment, in the process of reacting the urea and the amine compound, the reaction time is 4 hours to 48 hours. If the reaction temperature is greater than 160° C. and the reaction time exceeds 48 hours, then the polyurea oligomer product readily becomes yellow, and a ring byproduct is produced. If the temperature is too low and the reaction time is too short, then the reaction conversion rate is poor. If the reaction temperature and the reaction time are each within the ranges above, then better conversion rate and lower-chroma products may be obtained. The resulting polyurea oligomer is, for instance, a compound represented by formula 1 below:

$$H_2N-U^1-NH_2, \quad \text{[formula 1]}$$

wherein $U^1$ is

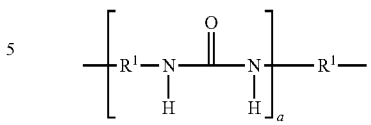

and a is an integer of 1 to 10000, each $R^1$ is independently a C1 to C20 alkylene group, a C3 to C20 cycloalkylene group, a C8 to C20 alkylarylene group, a polyether group having a weight-average molecular weight of 100 g/mol to 10000 g/mol, or a combination thereof.

Since the polyurea oligomer represented by formula 1 has more hydrogen donors, the subsequently-formed polyurethane urea composition has more hydrogen bonds, and the mechanical properties of the resulting polyurethane urea composition are improved as a result.

In step S110, the polyurea oligomer and the cyclic carbonate compound are mixed and reacted to obtain a polyurethane urea composition. The cyclic carbonate compound in the reaction is, for instance, a compound represented by formula 2 below:

[formula 2]

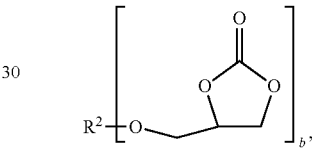

wherein b is 1 to 6, each $R^2$ is independently an aliphatic group, a cycloaliphatic group, an aromatic group substituted by an alkyl group or an unsubstituted aromatic group, an oligo polyether group, an oligo polyester group, or a combination thereof.

The molar ratio of the polyurea oligomer and the cyclic carbonate compound in the reaction is, for instance, 1:10 to 10:1, preferably 1:1 to 5:1. When the molar ratio of the polyurea oligomer and the cyclic carbonate compound is within the range above, better conversion rate and curing effect may be achieved. In an embodiment, in the process of reacting the polyurea oligomer and the cyclic carbonate compound, the reaction temperature is 0° C. to 160° C. In an embodiment, in the process of reacting the polyurea oligomer and the cyclic carbonate compound, the reaction time is 4 hours to 48 hours. If the reaction temperature is greater than 160° C., then yellowing readily occurs, and if the temperature is too low and the reaction time is too short, then conversion rate and curing are poor. If the reaction temperature and the reaction time are each within the ranges above, then better conversion rate and lower-chroma products may be obtained.

Since in the disclosure a cyclic carbonate compound is used to replace the known isocyanate to react with the polyurea oligomer, harm to the human body due to the volatilization of the highly-toxic isocyanate in the manufacturing process of the polyurethane urea composition may be avoided.

The polyurethane urea composition formed in the present embodiment has, for instance, a repeating unit represented by formula I below:

$$-R^2-U^2-U^1-U^2-R^2-, \text{ wherein} \quad \text{[formula I]}$$

$U^1$ is

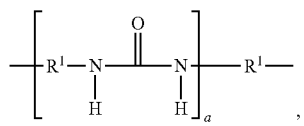

wherein a is an integer of 1 to 10000,
each $U^2$ is independently

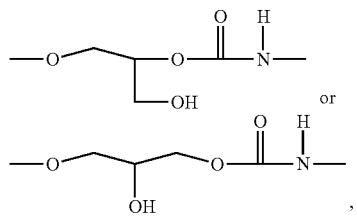

each $R^1$ is independently a C1 to C20 alkylene group, a C3 to C20 cycloalkylene group, a C8 to C20 alkylarylene group, a polyether group having a weight-average molecular weight of 100 g/mol to 10000 g/mol, or a combination thereof, and each $R^2$ is independently an aliphatic group, a cycloaliphatic group, an aromatic group substituted by an alkyl group or an unsubstituted aromatic group, an oligo polyether group, an oligo polyester group, or a combination thereof.

The polyurethane urea composition of the present embodiment is obtained by the reaction of a polyurea oligomer having many hydrogen donors and a cyclic carbonate compound, and therefore the resulting polyurethane urea composition has many hydrogen bonds and the molecular structure thereof is stable, such that the polyurethane urea composition has good mechanical properties such as tensile strength, elongation, and tear strength.

Figure 2:
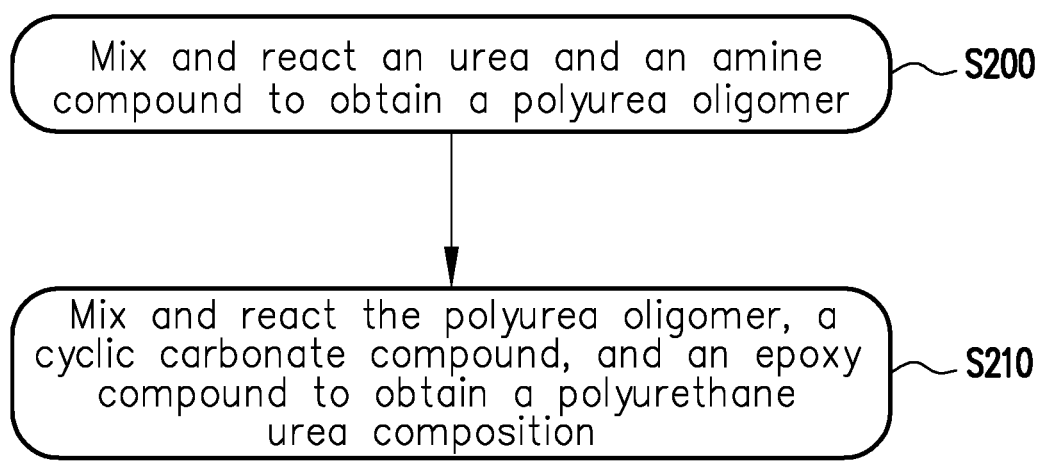
FIG. 2 is a preparation method of a polyurethane urea composition of another embodiment of the disclosure.

FIG. 2 is a preparation method of a polyurethane urea composition of another embodiment of the disclosure.

Referring to FIG. 2, the preparation method of the polyurethane urea composition of the disclosure includes steps S200 and S210. Since step S200 and step S100 are the same, step S200 is not repeated herein. In step S210, the polyurea oligomer, the cyclic carbonate compound, and the epoxy compound are mixed and reacted to obtain a polyurethane urea composition. The epoxy compound in the reaction is, for instance, a compound represented by formula 3 below:

[formula 3]

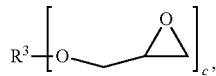

wherein c is 1 to 6, each $R^3$ is independently an aliphatic group, a cycloaliphatic group, an aromatic group substituted by an alkyl group or an unsubstituted aromatic group, an oligo polyether group, an oligo polyester group, or a combination thereof.

Specific examples of the epoxy compound may include, but not limited to, poly(propylene glycol) diglycidyl ether (PPGDG), 1,4-butanediol diglycidyl ether (BDGE), 1,6-hexanediol diglycidyl ether (HDGE), neopentyl glycol diglycidyl ether (NGDGE), 1,4-cyclohexanedimethanol diglycidyl ether (CDGE), resorcinol diglycidyl ether (RDGE), trimethylolpropane triglycidyl ether (TMTGE), diglycidyl ether of bisphenol-A (DGEBA), diglycidyl ether of bisphenol-F (DGEBF), or a combination thereof.

The molar ratio of the epoxy compound and the cyclic carbonate compound in the reaction is, for instance, 10:1 to 1:1, preferably 5:1 to 1:1. When the molar ratio of the epoxy compound and the cyclic carbonate compound is within the range above, the polyurethane urea composition may have better tensile properties, and the tear strength of the polyurethane urea composition is also increased.

Using the epoxy compound in the present embodiment may increase the tensile strength and the tear strength of the polyurethane urea composition, and the epoxy compound has a cross-link forming effect on polyurethane urea and may speed up the surface drying time of the coating layer.

The polyurethane urea composition formed in the present embodiment has, for instance, at least one of the repeating units represented by formula I, formula II, and formula III:

[formula II]
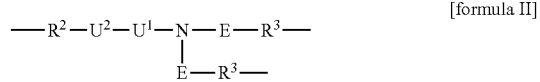

[formula III]
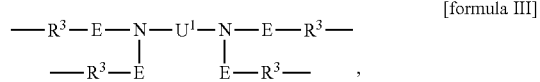

wherein
$U^1$ is

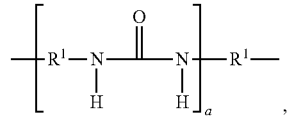

wherein a is an integer of 1 to 10000,
each $U^2$ is independently

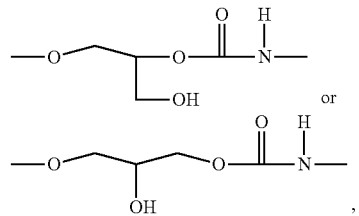

E is

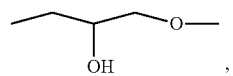

each $R^1$ is independently a C1 to C20 alkylene group, a C3 to C20 cycloalkylene group, a C8 to C20 alkylarylene group, a polyether group having a weight-average molecular weight of 100 g/mol to 10000 g/mol, or a combination thereof, and each $R^2$ and $R^3$ is independently an aliphatic group, a cycloaliphatic group, an aromatic group substituted by an alkyl group or an unsubstituted aromatic group, an oligo polyether group, an oligo polyester group, or a combination thereof.

In the polyurethane urea composition of the present embodiment, in addition to reacting the polyurea oligomer having a plurality of hydrogen donors and the cyclic carbonate compound to achieve good mechanical properties, the addition of the epoxy compound and adjusting the ratio thereof may produce polyurethane urea compositions having different mechanical properties. As a result, the commercial applications of the polyurethane urea composition may be increased.

In the following, several examples are provided to further describe the disclosure, but the examples are only exemplary and are not intended to limit the scope of the disclosure.

Synthesis of Polyurea Oligomer

SYNTHESIS EXAMPLE 1

Synthesis of Polyurea Oligomer (a-1)

The polyurea oligomer (a-1) was obtained by reacting urea and polyetheramine (JEFFAMINE® EDR-148 made by Huntsman Performance Products), and the synthesis steps are as follows: 60 g of urea and 296 g of polyetheramine were placed in a three-neck round bottom flask, and nitrogen was introduced at a temperature of 140° C. to react by heating for 12 hours to obtain a white gummy product. Analysis was performed on the product via a nuclear magnetic resonance spectrometer ($^1$H NMR), resulting in a reaction conversion rate of >99%.

SYNTHESIS EXAMPLE 2

Synthesis of Polyurea Oligomer (a-2)

The polyurea oligomer (a-2) was obtained by reacting urea and polyetheramine (JEFFAMINE® EDR-148 made by Huntsman Performance Products), and the synthesis steps are as follows: 60 g of urea and 652 g of polyetheramine were placed in a three-neck round bottom flask, and nitrogen was introduced at a temperature of 140° C. to react by heating for 12 hours to obtain a clear liquid product. Analysis was performed on the product via a nuclear magnetic resonance spectrometer ($^1$H NMR), resulting in a reaction conversion rate of >99%.

SYNTHESIS EXAMPLE 3

Synthesis of Polyurea Oligomer (a-3)

The polyurea oligomer (a-3) was obtained by reacting urea and polyetheramine (JEFFAMINE® EDR-148 made by Huntsman Performance Products), and the synthesis steps are as follows: 60 g of urea and 451 g of polyetheramine were placed in a three-neck round bottom flask, and nitrogen was introduced at a temperature of 140° C. to react by heating for 12 hours to obtain a clear liquid product. Analysis was performed on the product via a nuclear magnetic resonance spectrometer ($^1$H NMR), resulting in a reaction conversion rate of >99%.

SYNTHESIS EXAMPLE 4

Synthesis of Polyurea Oligomer (a-4)

The polyurea oligomer (a-4) was obtained by reacting urea and polyetheramine (JEFFAMINE® D-230 made by Huntsman Performance Products), and the synthesis steps are as follows: 60 g of urea and 460 g of polyetheramine were placed in a three-neck round bottom flask, and nitrogen was introduced at a temperature of 140° C. to react by heating for 12 hours to obtain a clear liquid product. Analysis was performed on the product via a nuclear magnetic resonance spectrometer ($^1$H NMR), resulting in a reaction conversion rate of >99%.

SYNTHESIS EXAMPLE 5

Synthesis of Polyurea Oligomer (a-5)

The polyurea oligomer (a-5) was obtained by reacting urea and polyetheramine (JEFFAMINE® D-230 made by Huntsman Performance Products), and the synthesis steps are as follows: 40 g of urea and 653 g of polyetheramine were placed in a three-neck round bottom flask, and nitrogen was introduced at a temperature of 140° C. to react by heating for 12 hours to obtain a clear liquid product. Analysis was performed on the product via a nuclear magnetic resonance spectrometer ($^1$H NMR), resulting in a reaction conversion rate of >99%.

SYNTHESIS EXAMPLE 6

Synthesis of Polyurea Oligomer (a-6)

The polyurea oligomer (a-6) was obtained by reacting urea and polyetheramine (JEFFAMINE® D-230 made by Huntsman Performance Products), and the synthesis steps are as follows: 40 g of urea and 455 g of polyetheramine were placed in a three-neck round bottom flask, and nitrogen was introduced at a temperature of 140° C. to react by heating for 24 hours to obtain a clear liquid product. Analysis was performed on the product via a nuclear magnetic resonance spectrometer ($^1$H NMR), resulting in a reaction conversion rate of >99%.

SYNTHESIS EXAMPLE 7

Synthesis of Polyurea Oligomer (a-7)

The polyurea oligomer (a-7) was obtained by reacting urea and polyetheramine (JEFFAMINE® D-230 made by Huntsman Performance Products), and the synthesis steps are as follows: 60 g of urea and 256 g of polyetheramine were placed in a three-neck round bottom flask, and nitrogen was introduced at a temperature of 140° C. to react by heating for 12 hours to obtain a clear liquid product. Analysis was performed on the product via a nuclear magnetic resonance spectrometer ($^1$H NMR), resulting in a reaction conversion rate of >99%.

Preparation of Polyurethane Urea Composition

EXAMPLE 1

Preparation of Polyurethane Urea Composition (b-1)

The preparation steps of the polyurethane urea composition (b-1) are as follows: 29 g of cyclic carbonate (BDCE) and 34 g of bisphenol A epoxy resin (Quatrex® 1010 made by Huntsman Performance Products) were evenly mixed, and then 53.4 g of the polyurea oligomer (a-1) prepared in synthesis example 1 was added and the mixture was evenly stirred. The mixture was vacuumed to remove air bubbles, and a tensile mold frame and a tear strength mold frame were added to cure and mold the mixture, and then the mixture was left at room temperature for 7 days and the mechanical properties thereof were measured. The results are shown in Table 1.

EXAMPLE 2

Preparation of Polyurethane Urea Composition (b-2)

The preparation steps of the polyurethane urea composition (b-2) are as follows: 29 g of cyclic carbonate (BDCE) and 34 g of bisphenol A epoxy resin (Quatrex® 1010 made by Huntsman Performance Products) were evenly mixed, and then 31.4 g of the polyurea oligomer (a-2) prepared in synthesis example 2 was added and the mixture was evenly stirred. The mixture was vacuumed to remove air bubbles, and a tensile mold frame and a tear strength mold frame were added to cure and mold the mixture, and then the mixture was left at room temperature for 7 days and the mechanical properties thereof were measured. The results are shown in Table 1.

EXAMPLE 3

Preparation of Polyurethane Urea Composition (b-3)

The preparation steps of the polyurethane urea composition (b-3) are as follows: 29 g of cyclic carbonate (BDCE) and 34 g of bisphenol A epoxy resin (Quatrex® 1010 made by Huntsman Performance Products) were evenly mixed, and then 37.6 g of the polyurea oligomer (a-3) prepared in synthesis example 3 was added and the mixture was evenly stirred. The mixture was vacuumed to remove air bubbles, and a tensile mold frame and a tear strength mold frame were added to cure and mold the mixture, and then the mixture was left at room temperature for 7 days and the mechanical properties thereof were measured. The results are shown in Table 1.

EXAMPLE 4

Preparation of Polyurethane Urea Composition (b-4)

The preparation steps of the polyurethane urea composition (b-4) are as follows: 17.4 g of cyclic carbonate (BDCE) and 47.6 g of bisphenol A epoxy resin (Quatrex® 1010 made by Huntsman Performance Products) were evenly mixed, and then 27.2 g of the polyurea oligomer (a-2) prepared in synthesis example 2 was added and the mixture was evenly stirred. The mixture was vacuumed to remove air bubbles, and a tensile mold frame and a tear strength mold frame were added to cure and mold the mixture, and then the mixture was left at room temperature for 7 days and the mechanical properties thereof were measured. The results are shown in Table 1.

EXAMPLE 5

Preparation of Polyurethane Urea Composition (b-5)

The preparation steps of the polyurethane urea composition (b-5) are as follows: 17.4 g of cyclic carbonate (BDCE) and 47.6 g of bisphenol A epoxy resin (Quatrex® 1010 made by Huntsman Performance Products) were evenly mixed, and then 32.6 g of the polyurea oligomer (a-3) prepared in synthesis example 3 was added and the mixture was evenly stirred. The mixture was vacuumed to remove air bubbles, and a tensile mold frame and a tear strength mold frame were added to cure and mold the mixture, and then the mixture was left at room temperature for 7 days and the mechanical properties thereof were measured. The results are shown in Table 1.

EXAMPLE 6

Preparation of Polyurethane Urea Composition (b-6)

The preparation steps of the polyurethane urea composition (b-6) are as follows: 17.4 g of cyclic carbonate (BDCE) and 47.6 g of bisphenol A epoxy resin (Quatrex® 1010 made by Huntsman Performance Products) were evenly mixed, and then 63.2 g of the polyurea oligomer (a-4) prepared in synthesis example 4 was added and the mixture was evenly stirred. The mixture was vacuumed to remove air bubbles, and a tensile mold frame and a tear strength mold frame were added to cure and mold the mixture, and then the mixture was left at room temperature for 7 days and the mechanical properties thereof were measured. The results are shown in Table 1.

EXAMPLE 7

Preparation of Polyurethane Urea Composition (b-7)

The preparation steps of the polyurethane urea composition (b-7) are as follows: 17.4 g of cyclic carbonate (BDCE) and 47.6 g of bisphenol A epoxy resin (Quatrex® 1010 made by Huntsman Performance Products) were evenly mixed, and then 40.6 g of the polyurea oligomer (a-5) prepared in synthesis example 5 was added and the mixture was evenly stirred. The mixture was vacuumed to remove air bubbles, and a tensile mold frame and a tear strength mold frame were added to cure and mold the mixture, and then the mixture was left at room temperature for 7 days and the mechanical properties thereof were measured. The results are shown in Table 1.

EXAMPLE 8

Preparation of Polyurethane Urea Composition (b-8)

The preparation steps of the polyurethane urea composition (b-8) are as follows: 17.4 g of cyclic carbonate (BDCE) and 47.6 g of bisphenol A epoxy resin (Quatrex® 1010 made by Huntsman Performance Products) were evenly mixed, and then 47.4 g of the polyurea oligomer (a-6) prepared in synthesis example 6 was added and the mixture was evenly stirred. The mixture was vacuumed to remove air bubbles, and a tensile mold frame and a tear strength mold frame were added to cure and mold the mixture, and then the mixture was left at room temperature for 7 days and the mechanical properties thereof were measured. The results are shown in Table 1.

EXAMPLE 9

Preparation of Polyurethane Urea Composition (b-9)

The preparation steps of the polyurethane urea composition (b-9) are as follows: 17.4 g of cyclic carbonate (BDCE)

and 47.6 g of bisphenol A epoxy resin (Quatrex® 1010 made by Huntsman Performance Products) were evenly mixed, and then 20.2 g of the polyurea oligomer (a-3) prepared in synthesis example 3 and 23.4 g of the polyurea oligomer (a-6) prepared in synthesis example 6 were added and the mixture was evenly stirred. The mixture was vacuumed to remove air bubbles, and a tensile mold frame and a tear strength mold frame were added to cure and mold the mixture, and then the mixture was left at room temperature for 7 days and the mechanical properties thereof were measured. The results are shown in Table 1.

EXAMPLE 10

Preparation of Polyurethane Urea Composition (b-10)

The preparation steps of the polyurethane urea composition (b-10) are as follows: 29 g of cyclic carbonate (BDCE) and 34 g of bisphenol A epoxy resin (Quatrex® 1010 made by Huntsman Performance Products) were evenly mixed, and then 380.1 g of the polyurea oligomer (a-7) prepared in synthesis example 7 was added and the mixture was evenly stirred. The mixture was vacuumed to remove air bubbles, and a tensile mold frame and a tear strength mold frame were added to cure and mold the mixture, and then the mixture was left at room temperature for 7 days and the mechanical properties thereof were measured. The results are shown in Table 1.

EXAMPLE 11

Preparation of Polyurethane Urea Composition (b-11)

The preparation steps of the polyurethane urea composition (b-11) are as follows: 17.4 g of trimethylolpropopane triscarbonate (TMPTC) and 54.4 g of bisphenol A epoxy resin (Quatrex® 1010 made by Huntsman Performance Products) were placed in a 150-mL measuring cup and evenly mixed, and then 51.1 g of the polyurea oligomer (a-6) prepared in synthesis example 6 was added and the mixture was evenly stirred. The mixture was vacuumed to remove air bubbles, and a tensile mold frame and a tear strength mold frame were added to cure and mold the mixture, and then the mixture was left at room temperature for 7 days and the mechanical properties thereof were measured. The results are shown in Table 1.

COMPARATIVE EXAMPLE 1

Preparation of Polyurethane Composition (c-1)

The preparation steps of the polyurethane composition (c-1) are as follows: 29 g of cyclic carbonate (BDCE) and 34 g of bisphenol A epoxy resin (Quatrex® 1010 made by Huntsman Performance Products) were evenly mixed, and then 22.2 g of polyetheramine (JEFFAMINE® EDR-148 made by Huntsman Performance Products) was added and the mixture was evenly stirred. The mixture was vacuumed to remove air bubbles, and a tensile mold frame and a tear strength mold frame were added to cure and mold the mixture, and then the mixture was left at room temperature for 7 days and the mechanical properties thereof were measured. The results are shown in Table 1.

COMPARATIVE EXAMPLE 2

Preparation of Polyurethane Composition (c-2)

The preparation steps of the polyurethane composition (c-2) are as follows: 17.4 g of cyclic carbonate (BDCE) and 47.6 g of bisphenol A epoxy resin (Quatrex® 1010 made by Huntsman Performance Products) were evenly mixed, and then 19.2 g of polyetheramine (JEFFAMINE® EDR-148 made by Huntsman Performance Products) was added and the mixture was evenly stirred. The mixture was vacuumed to remove air bubbles, and a tensile mold frame and a tear strength mold frame were added to cure and mold the mixture, and then the mixture was left at room temperature for 7 days and the mechanical properties thereof were measured. The results are shown in Table 1.

COMPARATIVE EXAMPLE 3

Preparation of Polyurethane Composition (c-3)

The preparation steps of the polyurethane composition (c-3) are as follows: 17.4 g of cyclic carbonate (BDCE) and 47.6 g of bisphenol A epoxy resin (Quatrex® 1010 made by Huntsman Performance Products) were evenly mixed, and then 29.9 g of polyetheramine (JEFFAMINE® D-230 made by Huntsman Performance Products) was added and the mixture was evenly stirred. The mixture was vacuumed to remove air bubbles, and a tensile mold frame and a tear strength mold frame were added to cure and mold the mixture, and then the mixture was left at room temperature for 7 days and the mechanical properties thereof were measured. The results are shown in Table 1.

TABLE 1

| | | Tensile strength (kgf/cm$^2$) | Elongation (%) | Tear strength (kgf/cm) |
|---|---|---|---|---|
| Polyurethane urea composition of examples | (b-1) | 17.5 | 148 | 153.5 |
| | (b-2) | 14.8 | 172 | 147.4 |
| | (b-3) | 18.5 | 153 | 156.6 |
| | (b-4) | 229.5 | 115 | 170.4 |
| | (b-5) | 226.4 | 123 | 172.8 |
| | (b-6) | 26.2 | 331 | 26.7 |
| | (b-7) | 36.6 | 268 | 24.2 |
| | (b-8) | 31.8 | 307 | 25.8 |
| | (b-9) | 104.0 | 188 | 53.3 |
| | (b-10) | 22.5 | 382 | 20.9 |
| | (b-11) | 164.9 | 144 | 114.7 |
| Polyurethane composition of comparative examples | (c-1) | 14.3 | 161 | 142.2 |
| | (c-2) | 373.5 | 17 | 170.1 |
| | (c-3) | 58.1 | 138 | 21.2 |

Although the polyurethane composition (c-2) of comparative example 2 has higher tear strength, the polyurethane composition (c-2) has very poor elongation. Moreover, although the polyurethane composition (c-3) of comparative example 3 has similar tensile strength and elongation to the polyurethane urea composition of each example, the polyurethane composition (c-3) of comparative example 3 is not as good as the polyurethane urea composition of each example in terms of tear strength.

Based on the above, since the polyurethane urea composition of the disclosure is obtained by replacing isocyanate with a cyclic carbonate compound as a raw material, harm to the human body due to the volatilization of the isocyanate in the manufacturing process of the polyurethane urea composition may be avoided. Moreover, in the disclosure, the polyurethane urea composition formed by using a polyurea oligomer as a raw material has more hydrogen bonds, and therefore mechanical properties such as tensile strength, tear strength, and elongation of the resulting polyurethane urea composition may be improved.

Moreover, in the disclosure, an epoxy compound is further used as a raw material and the ratio thereof is adjusted to achieve polyurethane urea compositions having different mechanical properties, and therefore commercial applications of the polyurethane urea composition may be increased.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A polyurethane urea composition obtained by reacting a polyurea oligomer and a cyclic carbonate compound, and a molar ratio of the polyurea oligomer and the cyclic carbonate compound is 1:10 to 10:1 comprising a repeating unit represented by formula I:

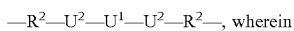  [formula I]

$U^1$ is

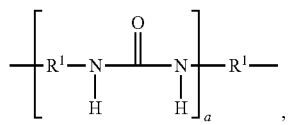

wherein a is an integer of 1 to 10000,
each $U^2$ is independently

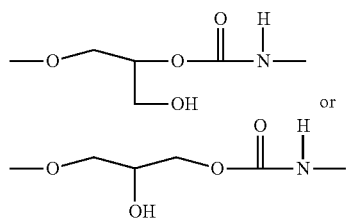

each $R^1$ is independently a C1 to C20 alkylene group, a C3 to C20 cycloalkylene group, a C8 to C20 alkylarylene group, a polyether group having a weight-average molecular weight of 100 g/mol to 10000 g/mol, or a combination thereof, and
each $R^2$ is independently an aliphatic group, a cycloaliphatic group, an aromatic group substituted by an alkyl group or an unsubstituted aromatic group, an oligo polyether group, an oligo polyester group, or a combination thereof, wherein the polyurea oligomer comprises a compound represented by formula 1:

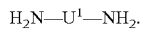  [formula 1]

2. The polyurethane urea composition of claim 1, wherein the cyclic carbonate compound comprises a compound represented by formula 2:

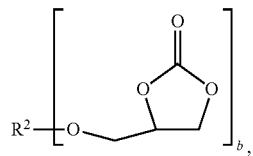  [formula 2]

wherein b is 1 to 6.

3. A polyurethane urea composition obtained by reacting an epoxy compound, a polyurea oligomer, and a cyclic carbonate compound, and a molar ratio of the epoxy compound and the cyclic carbonate compound is 10:1 to 1:1 comprising a repeating unit represented by formula I and at least one of the repeating units represented by formula II and formula III:

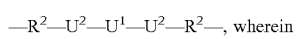  [formula I]

$U^1$ is

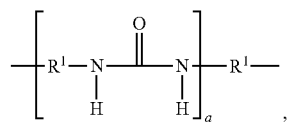

wherein a is an integer of 1 to 10000,
each $U^2$ is independently

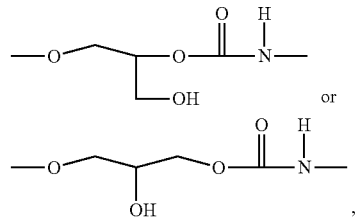

each $R^1$ is independently a C1 to C20 alkylene group, a C3 to C20 cycloaklene group, a C8 to C20 alkylarylene group, a polyether group having a weight-average molecular weight of 100 g/mol to 10000 g/mol, or a combination thereof, and
each $R^2$ is independently an aliphatic group, a cycloaliphatic group, an aromatic group substituted by an alkyl group or an unsubstituted aromatic group, an oligo polyether group, an oligo polyester group, or a combination thereof,

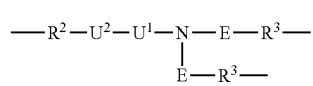  [formula II]

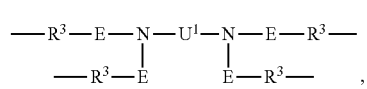  [formula III]

wherein
E is
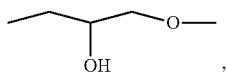
each $R^3$ is independently an aliphatic group, a cycloaliphatic group, an aromatic group substituted by an alkyl group or an unsubstituted aromatic group, an oligo polyether group, an oligo polyester group, or a combination thereof, wherein the epoxy compound comprises a compound represented by formula 3:
[formula 3]
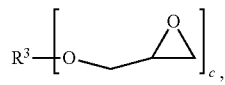
wherein c is 1 to 6.
* * * * *